US011629648B2

(12) United States Patent
Friedberg et al.

(10) Patent No.: US 11,629,648 B2
(45) Date of Patent: Apr. 18, 2023

(54) QUICK ACCESS ENGINE ROTATOR PAD

(71) Applicant: Hamilton Sundstrand Corporation, Charlotte, NC (US)

(72) Inventors: Craig Friedberg, Stillman Valley, IL (US); Matthew Allen Slayter, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 183 days.

(21) Appl. No.: 17/125,129

(22) Filed: Dec. 17, 2020

(65) Prior Publication Data

US 2022/0195944 A1 Jun. 23, 2022

(51) Int. Cl.
*F02C 7/32* (2006.01)
*F01D 25/34* (2006.01)
*F02C 7/06* (2006.01)
*F02C 7/22* (2006.01)
*F02C 7/275* (2006.01)
*F02C 7/28* (2006.01)

(52) U.S. Cl.
CPC .............. *F02C 7/32* (2013.01); *F01D 25/34* (2013.01); *F02C 7/06* (2013.01); *F02C 7/22* (2013.01); *F02C 7/275* (2013.01); *F02C 7/28* (2013.01); *F05D 2230/72* (2013.01); *F05D 2240/50* (2013.01); *F05D 2240/55* (2013.01); *F05D 2240/60* (2013.01); *F05D 2260/38* (2013.01); *F05D 2260/4031* (2013.01); *F05D 2260/83* (2013.01); *F05D 2260/98* (2013.01)

(58) Field of Classification Search
CPC .... F02C 7/32; F02C 7/22; F02C 7/275; F02C 7/28; F01D 25/34; F01D 25/30; F05D 2240/50; F05D 2240/55; F05D 2240/60; F05D 2260/38; F05D 2260/4031; F05D 2260/89; F05D 2260/98
See application file for complete search history.

(56) References Cited

U.S. PATENT DOCUMENTS 3,299,732 A * 1/1967 Loofbourrow ............ F02C 7/36
477/30
5,813,829 A * 9/1998 Mazzotta ................ F01D 25/34
464/169

(Continued)

FOREIGN PATENT DOCUMENTS

EP 0754838 A1 1/1997
EP 2415974 A2 2/2012

(Continued)

OTHER PUBLICATIONS

Extended European Search Report for EP Application No. 21215662.4, dated Apr. 29, 2022, pp. 8.

*Primary Examiner* — Woody A Lee, Jr.
*Assistant Examiner* — Joshua R Beebe
(74) *Attorney, Agent, or Firm* — Kinney & Lange, P. A.

(57) ABSTRACT

An assembly for manually rotating a rotor includes a housing enclosing a first shaft and a second shaft accessible through an exterior wall of the housing. The first shaft extends from a first end rotationally coupled to the rotor to a second end selectively engageable with the second shaft. The second shaft includes a thrust plate extending from and rotatable with the second shaft. A spring disposed between the thrust plate and the housing biases the second shaft towards the exterior wall of the housing.

16 Claims, 4 Drawing Sheets

(56) References Cited

U.S. PATENT DOCUMENTS

| | | | |
|---|---|---|---|
| 6,382,909 B1 * | 5/2002 | Voorhees | F04D 17/08 |
| | | | 464/169 |
| 7,559,739 B2 | 7/2009 | Colonna et al. | |
| 7,685,826 B2 | 3/2010 | McCooey et al. | |
| 8,419,351 B2 | 4/2013 | Richards | |
| 8,438,949 B2 | 5/2013 | Short et al. | |
| 8,845,275 B2 | 9/2014 | Short et al. | |
| 2006/0107787 A1 * | 5/2006 | Herlihy | F16H 1/22 |
| | | | 74/650 |
| 2010/0189548 A1 * | 7/2010 | Richards | F02C 7/36 |
| | | | 74/388 R |
| 2012/0026491 A1 * | 2/2012 | Short | F02C 7/32 |
| | | | 403/1 |
| 2012/0121373 A1 * | 5/2012 | Short | F02C 7/36 |
| | | | 74/405 |
| 2015/0233463 A1 * | 8/2015 | Galivel | F16H 57/031 |
| | | | 74/606 R |

FOREIGN PATENT DOCUMENTS

| | | | | |
|---|---|---|---|---|
| EP | 2602442 A1 | 6/2013 | | |
| EP | 3693575 A1 * | 8/2020 | | F01D 25/183 |
| WO | WO-2008082334 A1 * | 7/2008 | | F02C 7/32 |

* cited by examiner

QUICK ACCESS ENGINE ROTATOR PAD

BACKGROUND

The present invention relates to devices facilitating manual rotation of a component and, in particular, to gearboxes incorporating rotator features enabling manual rotation of components rotationally coupled to the gearbox, for example, a gas turbine engine rotor.

Modern gas turbine engines include rotator features to enable manual rotation of one or more rotors of the gas turbine engine during engine maintenance and inspection. Typically, a rotator will be located on an idler gear of the accessory gearbox known to drive various components necessary for proper operation of the gas turbine engine, which may include a fuel pump, a lubricating oil pump, a hydraulic pump, an air turbine starter, an electric generator, and an engine starter, among other possible engine accessory components. Locating the rotator along with the driven engine accessories requires components along the load path between the gas turbine rotor and the rotator location to accommodate loads associated with engine operation as well as relatively higher loads associated with manual rotation of a gas turbine engine rotor. Further, access to the rotator often requires removal of an access cover on the accessory gearbox. Failure to replace the access cover following maintenance potentially introduces foreign object debris into the accessory gearbox, lubrication system, and/or other systems of the gas turbine engine depending on the location of the rotator-gearbox interface as well as increases risk of lubrication leakage potentially rendering the accessory gearbox inoperable.

SUMMARY

An exemplary rotator assembly of the present invention includes a housing enclosing a first shaft and a second shaft accessible through an exterior wall of the housing. The first shaft extends from a first end rotationally coupled to the rotor to a second end selectively engageable with the second shaft. The second shaft includes a thrust plate extending from and rotatable with the second shaft. A spring disposed between the thrust plate and the housing biases the second shaft towards the exterior wall of the housing.

DETAILED DESCRIPTION

As disclosed herein is a rotator for rotating a gas turbine engine rotor without the assistance of the engine such as manual rotation of the gas turbine engine rotor for maintenance and inspection operations. By configuring the rotator to be selectively engageable to an input shaft of a transmission coupling the engine to an accessory gearbox rather than a component of the gearbox itself, the size and weight of many of the accessory gearbox components driving various engine accessories can be reduced as operational load path is restored, and rotator operation does not become a sizing constraint. A seal cap encircling a drive end of the rotator shaft isolates and protects the accessory gearbox and transmission interiors without requiring removal and reinstallation of an access cover while facilitating access to the drive end of the rotator auxiliary shaft. Further, motor and/or hand tool mounting provisions can be added to an exterior of accessory gearbox transmission and the drive end of such device configured to displace the rotator shaft into engagement with a shaft of the accessory gearbox transmission upon installation of the motor or hand tool. Additionally, the rotator shaft can be spring-loaded, facilitating automatic disengagement of the rotator shaft from the transmission shaft via a spring-generated restoring force acting on the rotator shaft after removal of the motor or hand tool.

While described in reference to a gas turbine engine rotator, features of the rotator disclosed herein can be incorporated into other applications in which manual rotation of a component would be beneficial. Within the aerospace industry, features of the disclosed rotator can be applied to a device for manual rotation of aircraft control surfaces or other aircraft actuation mechanisms. More generally, other applications are conceivable including manual rotation of industrial gas turbine engines, other turbomachines, or other industrial machine components.

Figure 1:
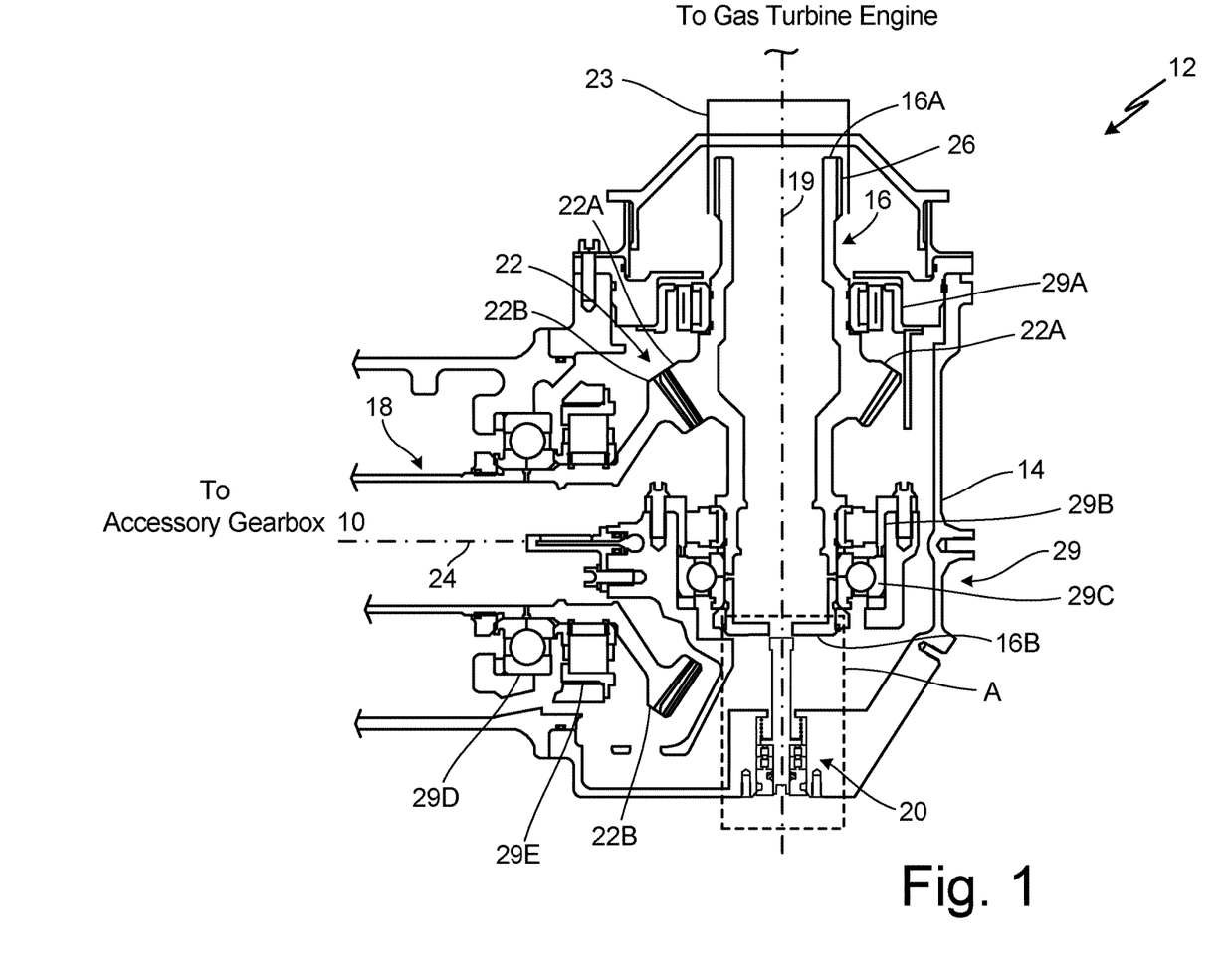
FIG. 1 is a cross-sectional view of a transmission coupling a gas turbine rotor to an accessory gearbox that incorporates a rotator for manual rotation of the gas turbine rotor.

FIG. 1 is a partial cross-sectional view of accessory gearbox 10 including transmission 12 rotationally coupling a gas turbine engine rotor to one or more engine accessories. Transmission 12 includes housing 14 enclosing input shaft 16 and output shaft 18. Input shaft 16 extends along axis 19 from engine-side end 16A, where input shaft 16 rotationally couples to a shaft of a gas turbine engine, to auxiliary-side end 16B, where input shaft 16 selectively couples to rotator 20. Between engine-side end 16A and auxiliary-side end 16B, input shaft 16 rotationally couples to output shaft 18 at gearing 22. Output shaft 18 extends along axis 24 from gearing 22 to accessory gearbox 10, where rotation of output shaft 18 drives one or more engine accessories which can include a fuel pump, a lubricating oil pump, a hydraulic pump, an air turbine starter, an electric generator, and an engine starter, among other possible engine accessory components.

The orientation of input shaft 16 is perpendicular to output shaft 18 in the embodiment depicted by FIG. 1 such that axes 19 and 24 are coplanar. However, input shaft 16 can be configured in other orientations relative to output shaft 18 compatible with the gas turbine engine application. For instance, axis 19 of input shaft 16 can be perpendicular to axis 24 of output shaft 18 without being coplanar, such as when axis 19 and axis 24 extend along mutually orthogonal directions. In other embodiments, input shaft 16 can extend along an oblique direction relative to output shaft 18, whether axes 19 and 24 are coplanar or not. In still other embodiments, axis 19 of input shaft 16 and axis 24 of output shaft 18 can be offset and parallel.

In each embodiment, gearing 22 can be selected to accommodate the relative orientations of input shaft 16 and output shaft 18 as well as to accommodate the mechanical design of transmission 12. In the depicted embodiment, gearing 22 includes intermeshing bevel gears 22A and 22B with straight or spiral profile gear teeth. Bevel gear 22A rotates with input shaft 16 while bevel gear 22B rotates with output shaft 18. Each of bevel gears 22A and 22B can be integrally manufactured with, joined to, or otherwise mechanically attached to respective shafts 16 and 18. In other embodiments, gearing 22 can take other potential configurations such as a spur gear pair, a spur gear and worm gear pair, or a spline coupling, among other possible configurations.

At engine-side end 16A, input shaft 16 includes spline 26, or other mechanical coupling for connecting input shaft 16 to a drive shaft of the gas turbine engine. For example, input shaft 16 can be rotationally coupled to an outer end of radial drive shaft 23 (sometimes referred to as a tower shaft) relative to a centerline of the gas turbine engine. At the inner end, radial drive shaft 23 rotationally couples to a turbine shaft or a compressor shaft of the gas turbine engine. During operation of gas turbine engine, energy extracted by the turbine drives rotation of the turbine shaft, the compressor shaft, and the radial drive shaft, which in turn drives accessory gearbox 10 via input shaft 16, output shaft 18, and gearing 22. However, when the gas turbine engine is not operating, rotator 20 can selectively engage auxiliary-side end 16B of input shaft 16 to manually rotate the gas turbine engine rotor facilitating maintenance and/or inspection of the gas turbine engine.

Input shaft 16 and output shaft 18 are laterally supported within housing 14 by one or more bearings 29, the number and position of each bearing determined based on the specific configuration of transmission 12 as well as the load and stiffness requirements for transmission 12, accessory gearbox 10, and the gas turbine engine. In the depicted embodiment, bearings 29A, 29B, and 29C laterally support input shaft 16. Bearing 29A supports input shaft 16 at a location between engine-side end 16A and gearing 22 while bearings 29B and 29C are adjacent to each other and located between gearing 22 and auxiliary-side end 16B along shaft 16. Similarly, bearings 29D and 29E laterally support output shaft 18 adjacent to gearing 22. The opposing side of output shaft 18 can be supported by another bearing and/or a coupling (not shown) of accessory gearbox 10.

Figure 2A:
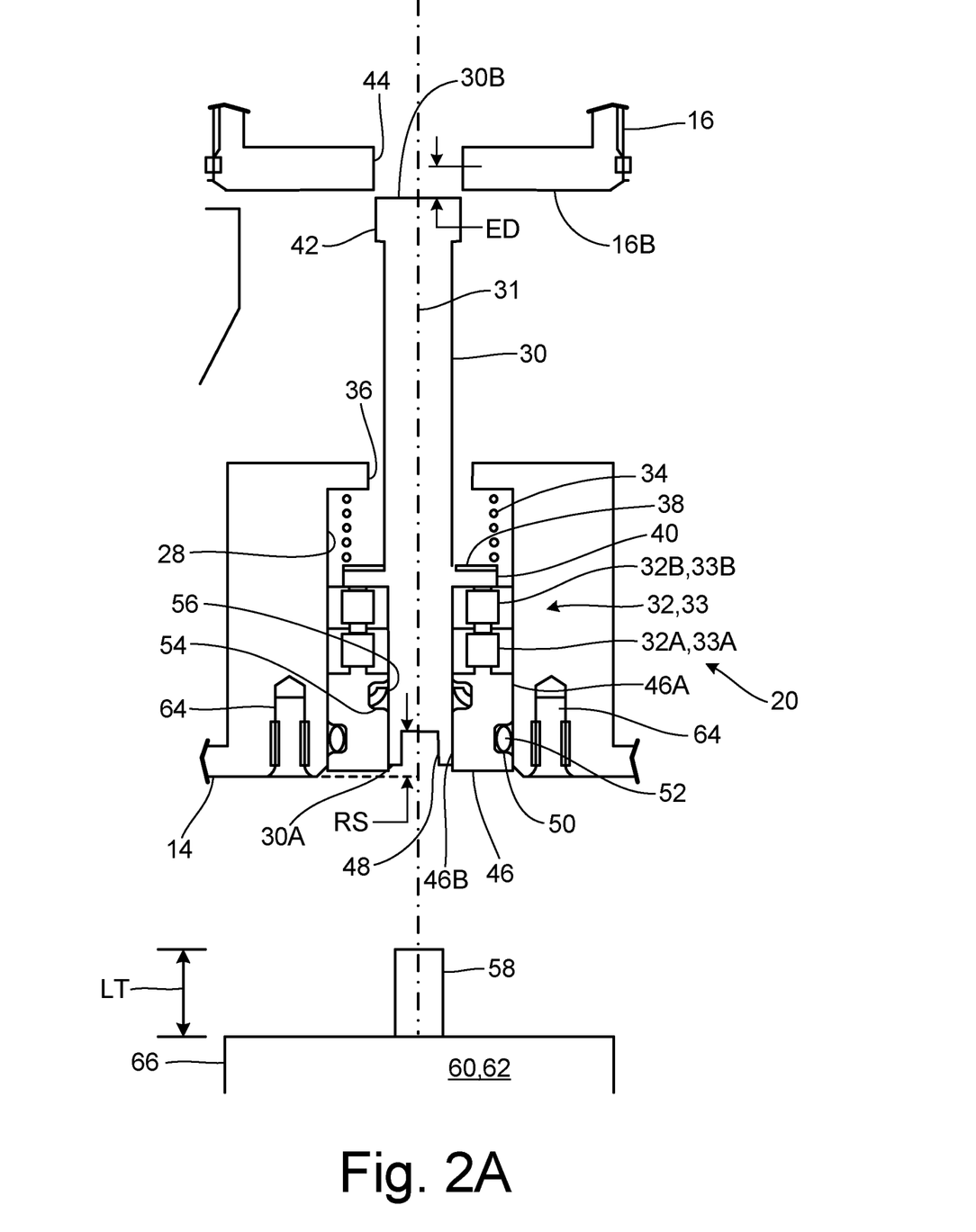
FIGS. 2A and 2B are enlarged detail views of region A from FIG. 1 depicting rotator engaged and disengaged to a shaft of the accessory gearbox transmission.
Figure 2B:
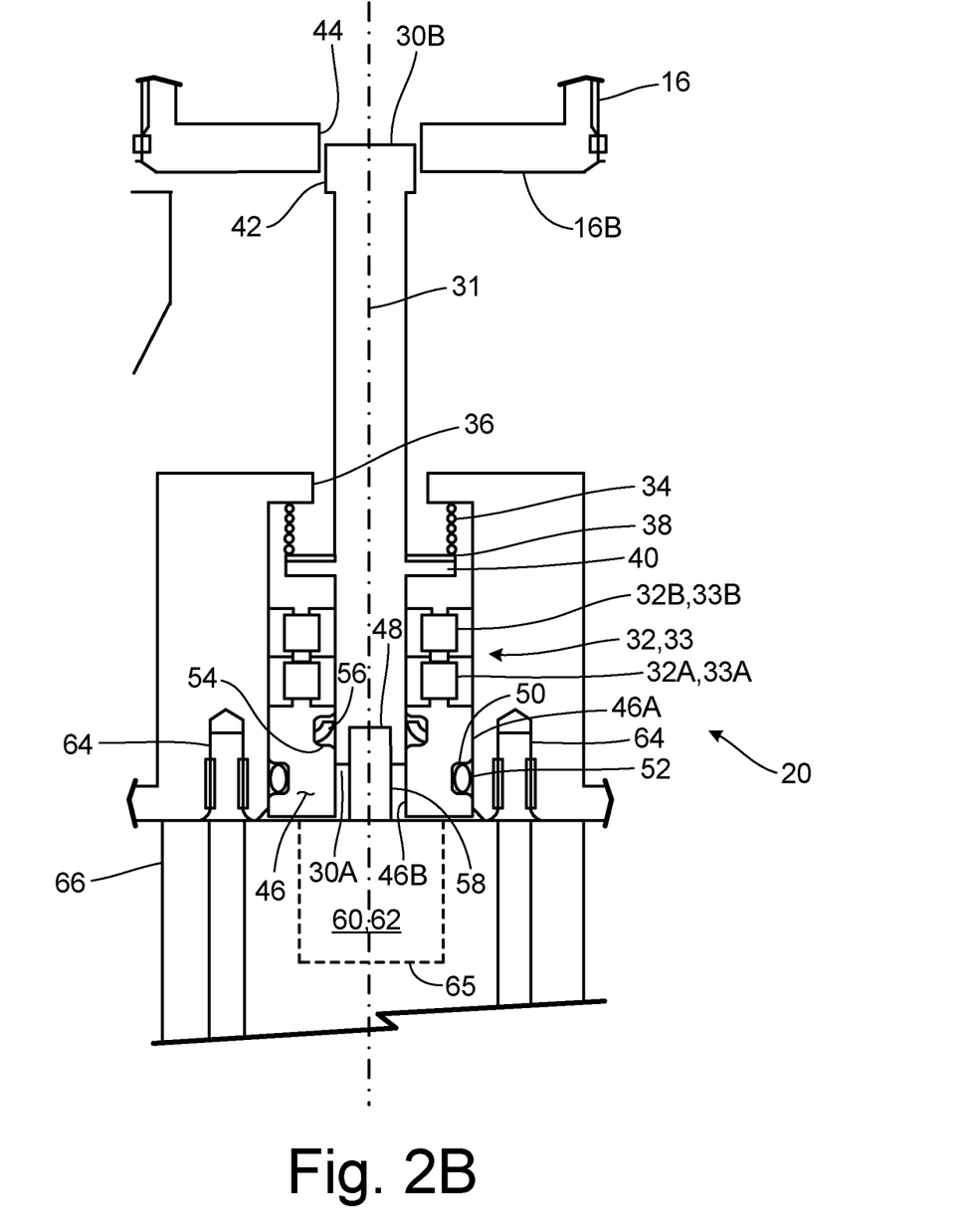

FIGS. 2A and 2B are enlarged views of region A from FIG. 1 depicting features of rotator 20 and associated components in greater detail. FIG. 2A depicts rotator 20 disengaged from input shaft 16, and FIG. 2B shows rotator 20 engaged to input shaft 16. All components of rotator 20 are installed into bore 28 of housing 14 without requiring a cover to shield rotator 20 and/or internal components of accessory gearbox 10 and transmission 12 internal to housing 14.

Rotator 20 includes auxiliary shaft 30 accessible through bore 28 of housing 14. Auxiliary shaft 30 extends from outboard end 30A to inboard end 30B along axis 31. One or more bearings 32 or bushings 33 laterally support auxiliary shaft 30 within bore 28. As depicted, bearings 32A and 32B form a duplex bearing laterally supporting auxiliary shaft 30. In other embodiments, bushings 33A and 33B can be used to provide lateral support of auxiliary shaft 30. Restraint of auxiliary shaft 30 along axis 31 is provided by spring 34 concentrically positioned about auxiliary shaft 30 and, at opposite ends of spring 34, engaging lip 36 of housing 14 and thrust washer 38, which in turn, abuts thrust plate 40 manufactured integrally with or otherwise mechanically attached to auxiliary shaft 30. As installed, spring 34 is at least partially compressed to bias auxiliary shaft 30 towards an exterior of housing 14.

At inboard end 30B, auxiliary shaft 30 includes rotational coupling 42 for engaging coupling 44 at auxiliary-side end 16B of input shaft 16. For instance, coupling 42 can be a spline along an outer diameter of auxiliary shaft 30 for engaging a corresponding spline formed along an inner diameter surface of input shaft 16. In other embodiments, coupling 42 can be a key drive formed by one or more square or rectangular cross-section keys seated into auxiliary shaft 30, and coupling 44 is a corresponding key socket formed by a complimentary keyway of input shaft 16.

Seal cap 46 is an annular body in which radially outer surface 46A engages bore 28 and radially inner surface 46B guides auxiliary shaft 30 along axis 31. Engagement of seal cap 46 can be achieved by providing an interference or location fit between outer surface 46A and bore 28, restraining seal cap 46 axially and laterally with respect to axis 31 and housing 14. In other embodiments, seal cap 46 can be retained within bore 28 using one or more snap rings. Further, seal cap 46 abuts bearing 32A and encloses bore 28 without obstructing access to outboard end 30A of auxiliary shaft 30, which is equipped with socket 48 for facilitating connection to a motor and/or a hand tool, manually turning auxiliary shaft 30, input shaft 16, and thereby rotating the gas turbine engine rotor and accessory gearbox components. Outer seal groove 50 extends into seal cap 46 and circumferentially along outer surface 46A of seal cap 46 to house static seal 52, and inner seal groove 54 extends into seal cap 46 and circumferentially along inner surface 46B of seal cap 46 to house sliding seal 56. As depicted in FIG. 2, static seal 52 is an o-ring and sliding seal 56 is a lip seal, although different static and sliding seal configurations can be used in other embodiments.

To utilize rotator 20, drive end 58 of motor 60 or hand tool 62 is inserted into socket 48 of auxiliary shaft 30. Drive end 58 can be a square driver and socket 48 can be a square socket. In some embodiments, socket 48 has square geometry common to both motor 60 and hand tool 62 driven ends 58, such as a standard socket and driver size typical for hand tools. However, other drivers and socket combinations can be used including custom or standard hexagonal or other polygonal driver and socket combinations.

If motor 60 is used to drive auxiliary shaft 30, motor 60 can be attached to housing 14 using bolt pattern 64, which can be configured as any suitable circumferentially spaced pattern of blind, threaded holes. In another example, motor 60 can be attached to housing 14 by a twist lock whereby a portion of motor 60 inserts into a cavity defined by housing 14 and is trapped in place following a twisting action of motor attachment. In either arrangement and as a consequence of attaching motor 60 to housing 14, drive end 58 displaces auxiliary shaft 30 along axis 31 and compresses spring 34 causing inboard end 30B of auxiliary shaft 30 to engage corresponding features on auxiliary-side end 16B of input shaft 16 as shown in FIG. 2B. For instance, length LT between mounting flange 66 and a distal end of drive end 58 can be equal to distance RS between an exterior of housing 14 and a bottom of socket 48 plus engagement distance ED necessary to rotationally couple to input shaft 16 between end 30B of auxiliary shaft 30 and auxiliary-side end 16B of input shaft 16. Whether implemented as complimentary splines or as complimentary key drive and key socket arrangement, mating features of couplings 42 and 44 can be equipped with lead-in features that promote angular alignment of couplings 42 and 44 as coupling 42 axially engages coupling 44. For instance, lead-in surfaces of couplings 42 and 44 can be equipped with a chamfer, a taper, or other feature tending to impose a torque about axis 31 of auxiliary shaft 30 to promote angular alignment. In other embodiments, coupling 42 can be angularly aligned to coupling 44 through manual manipulation of auxiliary shaft 30 using motor 60 or hand tool 62. Electric, pneumatic, or hydraulic power applied to motor 60 drives rotation of auxiliary shaft 30, input shaft 16, and output shaft 18 as well as the gas turbine engine rotor rotationally coupled to engine-side end 16A of input shaft 16 and engine accessories of accessory gearbox 10 driven by rotation of output shaft 18. In some embodiments, motor 60 can be equipped with reduction gearbox 65 such that for each rotation of motor 60, drive end 58 and auxiliary shaft 30 rotate a fractional rotation.

Hand tool 62 can be used to drive rotation of auxiliary shaft 30 in lieu of motor 60. In situations where hand tool 62 is a ratcheting hand tool, an operator of hand tool 62 exerts force along axis 31 during engagement of drive end 58 to socket 48, compressing spring 34 and engaging inboard end 30B with auxiliary-side end 16B of input shaft 16. Thereafter, the operator can rotate auxiliary shaft 30, input shaft 16, and output shaft 18 to turn the gas turbine engine rotor and engine accessories of accessory gearbox 10 while maintaining compression of spring 34. In other embodiments, hand tool 62 can be equipped with mounting flange 66 to facilitate attachment to housing 14 at bolt pattern 64. Like motor 60, when hand tool 62 is attached to housing 14 using mounting flange 66, the act of attaching mounting flange 66 to housing 14 engages socket 48 and simultaneously compresses spring 34 and engages inboard end 30B to auxiliary-side end 16B of input shaft 16. For this purpose, length LT between a tip of drive end 58 and mounting flange 66 is equal to recess distance RS between an exterior surface of housing 14 and the bottom of socket 48 plus an engagement distance ED necessary to displace auxiliary shaft 30 into engagement with input shaft 16. Once engaged, the operator can rotate auxiliary shaft 30, input shaft 16, and output shaft 18 as well as the gas turbine rotor and engine accessories of accessory gearbox 10 by applying a torque to hand tool 62.

Whether motor 60 or hand tool 62 is used to rotate auxiliary shaft 30, detaching motor 60, mounting flange 66 or hand tool 62 from bolt pattern 64 or otherwise disengaging drive end 58 from socket 48 displaces auxiliary shaft 30 towards an exterior surface of housing 14 and disengages input shaft 16 under a restoring force from spring 34. Accordingly, when gas turbine engine is operating, auxiliary shaft 30 is disengaged as shown in FIG. 2A eliminating unnecessary wear to auxiliary shaft 30, and sliding seal 52. This configuration also is accessible from an exterior of housing 14 without removing a cover as is typical in conventional rotator configurations.

Figure 3:
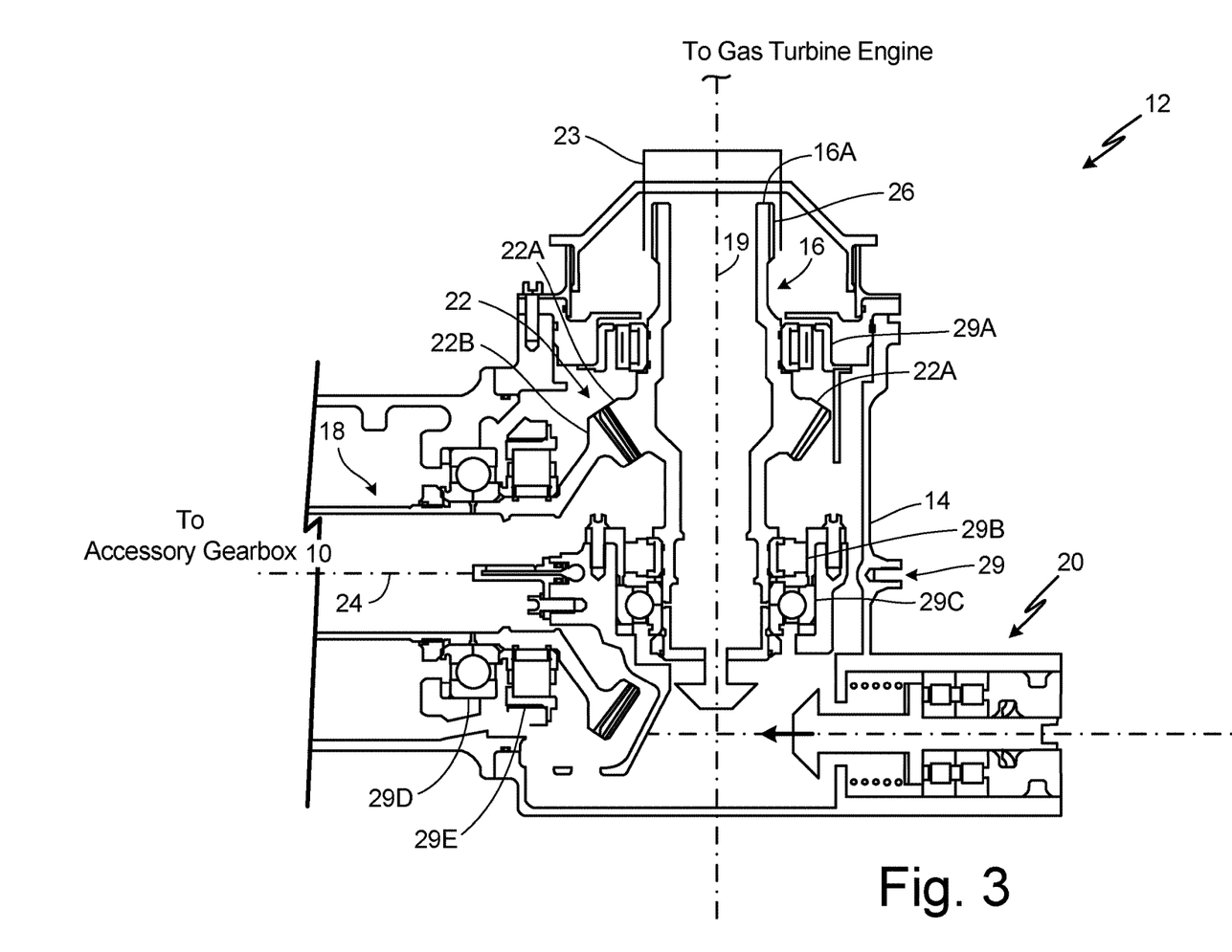
FIG. 3 is a schematic representation of an alternative configuration of the rotator in relation to components of the accessory gearbox transmission.

FIGS. 2A and 2B show rotator 20 in an orientation accessible from the bottom of accessory gearbox 10 when installed on the gas turbine engine and auxiliary shaft 30 displaces upward to engage input shaft 16. This configuration allows maintenance to be performed easily on-wing after opening the engine cowl doors. However, auxiliary shaft 30 need not displace vertically to engage input shaft 16, but can be configured to displace laterally or from a side of accessory gearbox 10 as installed on the gas turbine engine as shown in FIG. 3. Still other configurations are possible. For instance, rotator 20 can be mounted to an aft or forward portion of accessory gearbox 10. Alternatively, rotator 20 can be mounted to the top of accessory gearbox 10 such that auxiliary shaft 30 translates downward to engage input shaft 16 when installed on the gas turbine engine. As depicted, rotator 20 can be installed in any location and angle providing convenient access to auxiliary shaft 30 and input shaft 16.

DISCUSSION OF POSSIBLE EMBODIMENTS

The following are non-exclusive descriptions of possible embodiments of the present invention.

An assembly according to an exemplary embodiment of this disclosure, among other possible things includes a housing enclosing a first shaft extending from a first spline at a first end to a second spline or a key-drive socket at a second end. A second shaft extends from a third end accessible through an exterior wall of the housing to a third spline complementary to the second spline or a key-drive complimentary to the key-drive socket at a fourth end. A thrust plate extends from and rotates with the second shaft, and a spring circumscribes the second shaft between the thrust plate and the housing biasing the second shaft towards the exterior wall of the housing.

The assembly of the preceding paragraph can optionally include, additionally and/or alternatively, any one or more of the following features, configurations and/or additional components.

A further embodiment of the foregoing assembly, wherein the spring can be compressed to rotatably couple the second shaft to the first shaft via mutual engagement of the first and second splines or the key-drive and key-drive socket.

A further embodiment of any of the foregoing assemblies can include a motor mounted to the exterior wall of the housing.

A further embodiment of any of the foregoing assemblies can include a drive shaft rotationally coupling the motor to the third end of the second shaft.

A further embodiment of any of the foregoing assemblies, wherein the drive shaft can include a square end.

A further embodiment of any of the foregoing assemblies, wherein the third end of the second shaft can include a socket.

A further embodiment of any of the foregoing assemblies, wherein the socket can be square.

A further embodiment of any of the foregoing assemblies, wherein the drive shaft can engage the socket.

A further embodiment of any of the foregoing assemblies, wherein the drive shaft can be rotationally coupled to the motor by a reduction gearbox such that for each rotation of the motor, the drive shaft rotates a fractional rotation.

A further embodiment of any of the foregoing assemblies, wherein a length of the drive shaft can be greater than a distance between the socket and the exterior wall of the housing plus an engagement distance between the fourth end of the second shaft and the second end of the first shaft such that engagement of the drive shaft with the third end of the second shaft compresses the spring and thereby rotationally couples the second shaft to the first shaft.

A further embodiment of any of the foregoing assemblies can include a seal cap affixed within a bore of the housing and circumscribing the third end of the second shaft.

A further embodiment of any of the foregoing assemblies can include a static seal disposed within a first groove extending circumferentially about an outer diameter of the seal cap, the static seal engaging the bore of the housing.

A further embodiment of any of the foregoing assemblies can include a lip seal disposed within a second groove extending circumferentially about an inner diameter of the seal cap, the lip seal engaging the second shaft.

A further embodiment of any of the foregoing assemblies can include a first bevel gear extending from the first shaft between the first end and the second end and a second bevel gear intermeshed with the first bevel gear rotationally coupling a third shaft to the first shaft.

A further embodiment of any of the foregoing assemblies can include a radial drive shaft rotationally coupling a rotor of a gas turbine engine to the first shaft at the first end.

A further embodiment of any of the foregoing assemblies can include an accessory gearbox rotationally coupled to the third shaft, the accessory gearbox rotationally coupled to one or more of a fuel pump, a lubricating oil pump, a hydraulic pump, an air turbine starter, a generator, and an engine starter.

A further embodiment of any of the foregoing assemblies can include a duplex bearing or bushing affixed within the bore relative to the seal cap laterally supporting the second shaft.

A further embodiment of any of the foregoing assemblies can include a thrust washer abutting the thrust plate and engaging the spring.

A method of rotating a gas turbine engine comprising a radial drive shaft and a transmission rotationally coupling a rotor of the gas turbine engine to an accessory gearbox according to an exemplary embodiment of this disclosure, among other possible steps and things includes attaching one of a motor and a hand tool to an auxiliary drive shaft and thereby displacing the auxiliary drive shaft along a longitudinal axis thereof to rotationally couple the auxiliary drive shaft to a shaft of the transmission and rotating the rotor by rotating the shaft using the one of the motor and the hand tool.

The method of the preceding paragraph can optionally include, additionally and/or alternatively, any one or more of the following features, configurations, additional components and/or steps.

A further embodiment of the foregoing method, wherein attaching the one of the motor and the hand tool to the auxiliary drive shaft can include engaging a square drive to a square socket formed in an exterior end of the auxiliary drive shaft.

A further embodiment of any of the foregoing methods can include rotating the accessory gearbox simultaneously with rotating the rotor using the one of the motor and the hand tool.

A further embodiment of any of the foregoing methods can include rotating the accessory gearbox via a bevel gear disposed between the auxiliary drive shaft and the radial drive shaft.

A further embodiment of any of the foregoing methods can include detaching the one of the motor and the hand tool from the auxiliary drive shaft and thereby restoring the auxiliary drive shaft to a disengaged position using a spring.

A further embodiment of any of the foregoing methods, wherein attaching the one of the motor and the hand tool to the auxiliary drive shaft includes orienting a rotational axis of the one of the motor and the hand tool parallel with an axis of the auxiliary drive shaft and the shaft of the transmission.

A further embodiment of any of the foregoing methods, wherein attaching the one of the motor and the hand tool to the auxiliary drive shaft includes orienting a rotational axis of the one of the motor and the hand tool oblique to an axis of the auxiliary drive shaft and the shaft of the transmission.

A further embodiment of any of the foregoing methods, wherein attaching the one of the motor and the hand tool to the auxiliary drive shaft includes mounting the one of the motor and the hand tool to an exterior of the housing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. An assembly comprising:
   a housing enclosing a first shaft extending from a first spline at a first end to a second spline or a key-drive socket at a second end, wherein the housing defines a bore and a lip extending from the housing into the bore;
   a second shaft extending from a third end accessible through an exterior wall of the housing to a third spline complementary to the second spline or a key-drive complimentary to the key-drive socket at a fourth end;
   a radial drive shaft rotationally coupling a rotor of a gas turbine engine to the first shaft at the first end;
   a seal cap affixed entirely within a bore of the housing at the exterior wall and circumscribing the third end of the second shaft;
   a duplex bearing or bushing affixed within the bore and abutting the seal cap laterally supporting the second shaft;
   a static seal disposed within a first groove extending circumferentially about an outer diameter of the seal cap, the static seal engaging the bore of the housing;
   a lip seal disposed within a second groove extending circumferentially about an inner diameter of the seal cap, the lip seal engaging the second shaft;
   a thrust plate extending from and rotatable with the second shaft, wherein the thrust plate is disposed between the duplex bearing or bushing and the lip of the housing;
   a spring circumscribing the second shaft and between the thrust plate and the lip of the housing;
   wherein the spring biases the second shaft towards the exterior wall of the housing.

2. The assembly of claim 1, wherein the spring is compressible to rotatably couple the second shaft to the first shaft via mutual engagement of the first and second splines or the key-drive and the key-drive socket.

3. The assembly of claim 1, further comprising:
   a motor mounted to the exterior wall of the housing; and
   a drive shaft rotationally coupling the motor to the third end of the second shaft.

4. The assembly of claim 3, wherein the drive shaft includes a square end that engages a socket at the third end of the second shaft.

5. The assembly of claim 3, further comprising:
   wherein the drive shaft is rotationally coupled to the motor by a reduction gearbox such that for each rotation of the motor, the drive shaft rotates a fractional rotation.

6. The assembly of claim 3, wherein a length of the drive shaft is greater than a distance between the socket and the exterior wall of the housing plus an engagement distance between the fourth end of the second shaft and the second end of the first shaft such that engagement of the drive shaft with the third end of the second shaft compresses the spring and thereby rotationally couples the first and second shafts.

7. The assembly of claim 1, further comprising:
   a first bevel gear extending from the first shaft between the first end and the second end;
   a second bevel gear intermeshed with the first bevel gear; and
   a third shaft rotationally coupled to the first shaft via the first and second bevel gears.

8. The assembly of claim 7, further comprising:
   an accessory gearbox rotationally coupled to the third shaft, the accessory gearbox rotationally coupled to one or more of a fuel pump, a lubricating oil pump, a hydraulic pump, an air turbine starter, a generator, and an engine starter.

9. The assembly of claim 1, further comprising:
a thrust washer abutting the thrust plate and engaging the spring.

10. A method of rotating the gas turbine engine using the assembly of claim 1, the method comprising:
attaching one of a motor and a hand tool to the third end of the second shaft and thereby displacing the second shaft along a longitudinal axis thereof to rotationally couple the second shaft to the first shaft; and
rotating the rotor by rotating the first shaft and the second shaft using the one of the motor and the hand tool.

11. The method of claim 10, wherein attaching the one of the motor and the hand tool to the second shaft includes engaging a square drive to a square socket formed in the third end of the second shaft.

12. The method of claim 10, further comprising:
rotating an accessory gearbox simultaneously with rotating the rotor using the one of the motor and the hand tool, wherein the first shaft of the assembly drives the accessory gearbox via a bevel gear disposed between the second shaft and the radial drive shaft.

13. The method of claim 10, further comprising:
detaching the one of the motor and the hand tool from the second shaft and thereby restoring the second shaft to a disengaged position using the spring.

14. The method of claim 10, wherein attaching the one of the motor and the hand tool to the second shaft includes orienting a rotational axis of the one of the motor and the hand tool parallel with an axis of the second shaft and the first shaft of the assembly.

15. The method of claim 10, wherein attaching one of the motor and the hand tool to the second shaft includes orienting a rotational axis of the one of the motor and the hand tool oblique to an axis of the second shaft and the first shaft of the assembly.

16. The method of claim 10, wherein attaching the one of the motor and the hand tool to the second shaft includes mounting the one of the motor and the hand tool to an exterior of the housing.

\* \* \* \* \*